United States Patent [19]

Finch

[11] 3,901,811
[45] Aug. 26, 1975

[54] LIQUID SKIMMER METHOD AND APPARATUS

[75] Inventor: William C. Finch, Houston, Tex.

[73] Assignees: William C. Finch; Michael P. Breston, both of Houston, Tex. ; a part interest to each

[22] Filed: Jan. 17, 1973

[21] Appl. No.: 324,461

[52] U.S. Cl. ............... 210/538; 210/540; 166/105
[51] Int. Cl.² ............. B01D 23/00; B01D 17/02; F28D 15/00
[58] Field of Search ....... 210/51, 23, 301, 532, 513, 210/DIG. 21, 144, 221, 514, 83, 242, 523, 540; 166/68, 105, 54.1, 297, 298

[56] References Cited
UNITED STATES PATENTS

| | | | |
|---|---|---|---|
| 2,435,407 | 2/1948 | Pryor | 166/105 |
| 2,605,712 | 8/1952 | Davis et al. | 166/54.1 |
| 2,692,051 | 10/1954 | Webb | 210/532 |
| 2,777,581 | 1/1957 | Unthank | 210/532 |
| 2,910,002 | 10/1959 | Morgan | 166/54.1 |
| 2,946,387 | 7/1960 | Hooker, Jr. | 210/532 |
| 3,284,349 | 11/1966 | Wessels | 210/513 X |
| 3,419,145 | 12/1968 | De Celis | 210/84 |
| 3,469,702 | 9/1969 | Perren | 210/301 |
| 3,478,873 | 11/1969 | McLean | 210/23 |
| 3,527,348 | 9/1970 | Lalonde et al. | 210/84 |

Primary Examiner—Frank A. Spear, Jr.
Assistant Examiner—Ferris H. Lander
Attorney, Agent, or Firm—Michael P. Breston

[57] ABSTRACT

A method and apparatus for removing an overlying liquid from an underlying liquid in a two-liquid body by using a skimmer. The skimmer has a closed end, positioned sufficiently below the interface of the liquids to form a storage reservoir, and has at least one port extending above such interface, whereby the overlying liquid flows through the port into the reservoir from which it is removed as it is collected or subsequent thereto. The invention has particular application to skimmer wells for underground oil spills and, in general, for mechanically separating oil from water in almost any environment.

1 Claim, 8 Drawing Figures

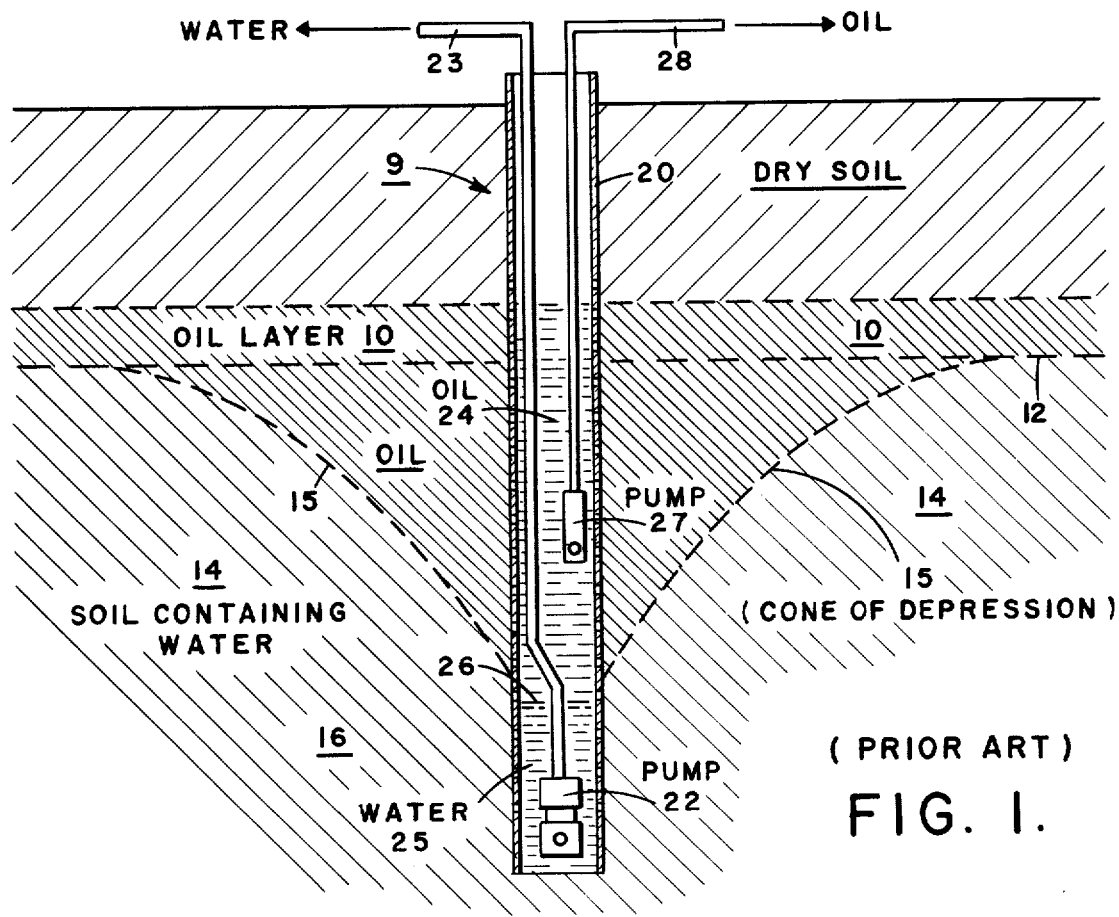
(PRIOR ART) FIG. 1.
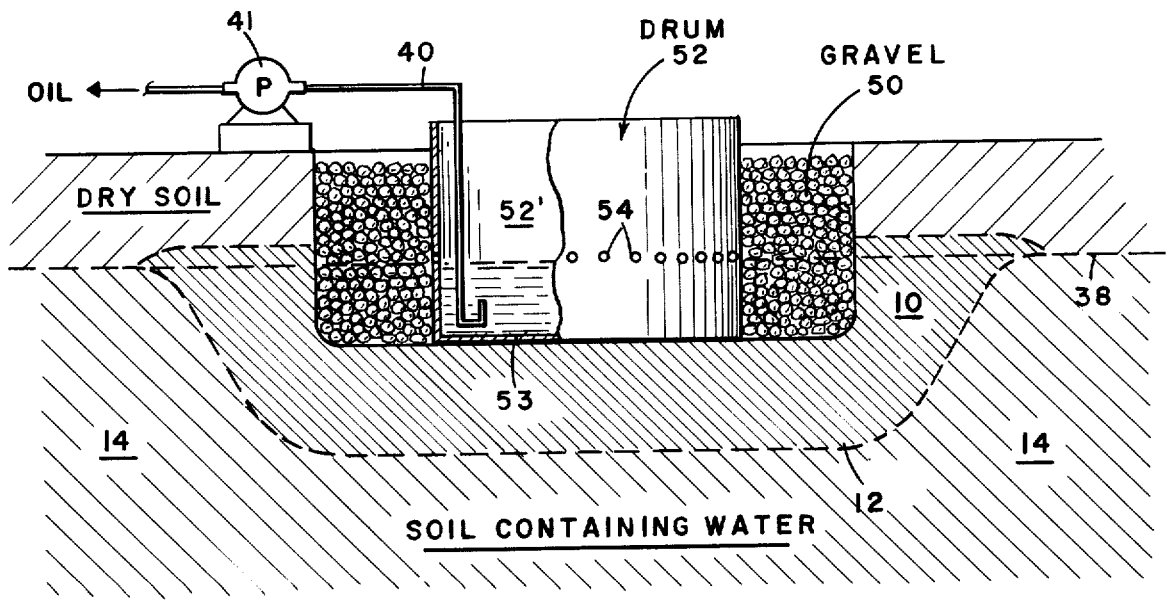
FIG. 3.

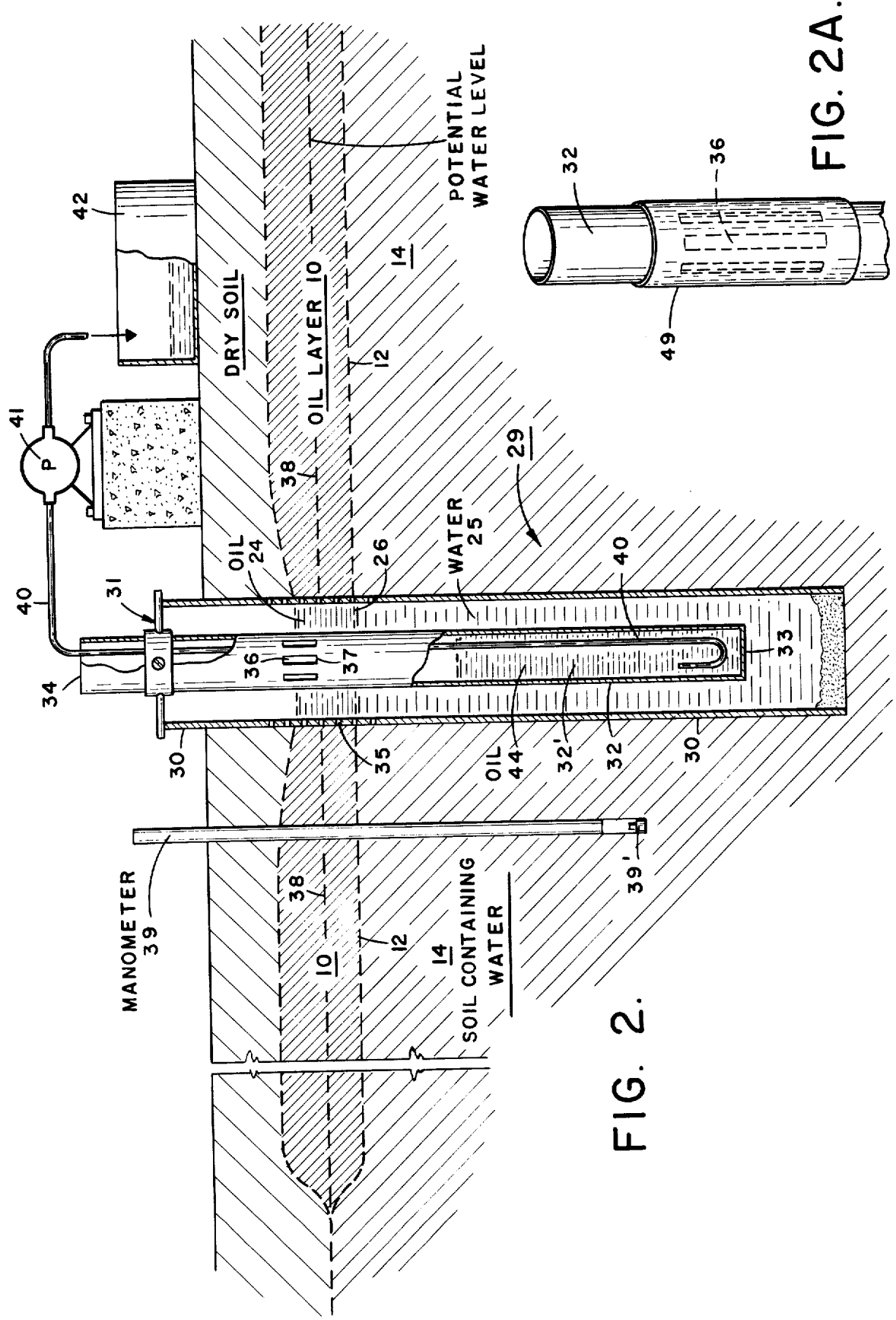

LIQUID SKIMMER METHOD AND APPARATUS

BACKGROUND OF THE INVENTION

Underground oil spills are not new. They have been occurring for as many years as oil has been stored. They occur primarily under refineries, oil storage facilities, chemical plants and pipelines through accidental spillage or through undetected leaks. Corrosion or rupture of storage or transport vessels are the most common causes of oil spills. If undetected for long, these spilled hydrocarbons grow into major accumulations and can seriously endanger underground water supplies, or leak into surface water bodies, causing innumerable physical, legal and public relation problems. Such oil spills seep into the earth until they reach a geologic formation containing water and there they come to rest on the underground water surface or water table. Water tables may be located from a foot or so to a hundred or more feet below ground surface. Geological, water-bearing zones, that have permeabilities high enough to allow the easy entrance of water into water producing wells, are called aquifers. The size and shape of aquifers can range from restricted fracture zones in dense granite, for example, to tabular bodies of sedimentary rock extending over thousands of square miles.

Overproduction of groundwater in urban and agricultural areas has caused serious depletion of aquifers and lowering of groundwater levels in many parts of the world. This overproduction sometimes allows inflows of polluted waters and oil spills into underground aquifers. Often it produces land subsidence.

Water that fills the voids of an aquifer exerts some pressure in an aquifer and thus helps support the weight of the overburden of sediments. When the water is removed, supporting pressure is reduced and the weight of the overburden rests entirely upon the aquifer, thereby causing it and adjacent materials to compact and thus land surfaces to subside.

State and Federal regulations are becoming increasingly stringent against polluters of aquifers. Offenders have been assigned the responsibility of removing their products from underground aquifers. Since the most common pollutants are hydrocarbons, herein for convenience called "oils", the following description will be concerned primarily with the removal of oils from underground as well as from surface water bodies.

A known method for recovering underground oil spills consists of drilling a well several feet below the surface of the underground water table and casing it properly with pipe that is perforated from the water table down to the bottom of the well. A submersible pump is lowered deep into the well to pump large quantities of water. The pumping action produces an ambient "cone of depression" in the water table thereby allowing oil to collect in the cone in and around the well's casing. Such a well is sometimes called a "collector well", because it collects oil from a relatively large area around the well bore.

Resting upon the water, inside the cone of depression, and entirely filling it, there develops an inverted cone of accumulated oil whose height is equal to the depth of the cone of depression. The submersible water pump is operated continuously to maintain this cone of depression at a fixed level and to pump only water. A second, and much smaller volume submersible oil pump is lowered into the oil column, above the oil-water interface, and put into operation. The oil pump also operates continuously, but at a lower rate, to remove oil from the cone of depression into suitable storage. The oil removal process is continued until oil inflow to the cone is substantially depleted, and the operation is completed.

The disadvantages of the collector well are attributed primarily to the need for employing two pumps in each well and to the need for employing skilled operators. Unskilled operators commonly produce an undesired mixture of oil and water, which is difficult to dispose of, and sometimes they even produce only water instead of pure oil as desired.

Another drawback is the frequent need in the collector well method for pumping very high volumes of water which, in certain instances, may produce land subsidence or endanger surrounding structures, such as seawalls, etc.

Collector wells also require constant attention to maintain an optimum or steady state oil-water interface relationship for preventing the water pump from coning in oil, or the oil pump from sucking in water. Because it is nearly impossible to prevent some oil from becoming mixed with produced water, the water pump frequently sucks in bacterial slimes that plug it up and cause the pump to burn up. Also, since it is most desirable for oil inflow, into the collector well, to equal outflow from the oil pump, constant measurements must be made to adjust pumping rates of both oil and water pumps so that the oil-water interface remains stable. Without such measurements, either or both pumps are likely to pump dry causing great inefficiencies and frequent pump failures. To prevent some of the above drawbacks, special instrumentation was developed, but it was found to be too sophisticated and expensive to be of practical use.

The advantage of the collector well, however, lies in the fact that it can be drilled at a location somewhat remote from the locus of the oil spill and yet attract oil into its cone of depression. Also, such a well can remove oil from a relatively large radius of influence or working area.

It is a general object of this invention to avoid the above mentioned and other drawbacks of the collector well and its method of use, and to provide, in general, a method using a skimmer for removing an undesired upper layer of liquid from a two-liquid body. The method is economical to use, and requires simple apparatus which can be left unattended for prolonged periods of time. Other advantages will become apparent from the following description.

SUMMARY OF THE INVENTION

The skimmer method employs a skimmer for removing a liquid that overlies another liquid by skimming off the overlying liquid with a closed-end skimmer container that provides a reservoir which is perforated at a predetermined distance between its bottom and top ends. This distance is such that the reservoir can contain an appreciable volume of collected liquid. The container is immersed into the two-liquid body, with its bottom being lowered sufficiently below the interface of the two liquids to permit positioning the skimmer's perforations just above the oil-water interface. In this position oil enters through the perforations into the reservoir and is continuously or subsequently removed therefrom.

In the case of a skimmer well, or open ditch employed in recovering oil from an underground oil spill, the oil-water interface rises as the oil is removed, therefore, it is necessary to position the skimmer, in the borehole, so that the perforations are constantly maintained at or above the rising interface. This can be done mechanically as needed, or the skimmer's ports or perforations can be set above the free or potential water level, and thus remain above water level at all times. For the case where the two-liquid body is composed of oil and water, an improved embodiment of this invention circumvents the need of lifting the skimmer by covering the ports in the skimmer with a hydrophobic and oleophyllic filter which permits only oil to enter the skimmer even if its ports are partly submerged in water. The skimmer is thus particularly adapted for use in tidal areas where constantly rising and falling groundwater levels make it difficult to maintain the ports at their necessary "above-interface" position.

The invention also has wide applications for improvement of existing conventional oil-traps now in oilfield use, for separating oil from water in open ditches, in steam-blowdown water tanks, and at service stations and sewer plants. Another use will be for separating grease from soups or spaghetti sauce in homes and restaurants. The skimmer without a hydrophobic membrane can be employed in an ordinary barrel to segregate any two fluids of different densities. Many applications of this invention are possible in laboratories both with and without the hydrophobic membrane. Indeed the invention is operable with any special membrane adapted to accomplish the purpose of segregation of special liquids.

BRIEF DESCRIPTION OF THE DRAWINGS

FIG. 1 schematically illustrates a prior art collector well;

FIG. 2 illustrates schematically the skimmer well of this invention;

FIG. 2A illustrates the use of a hydrophobic filter to cover the ports of the skimmer pipe;

FIG. 3 illustrates an open pit skimmer well of this invention;

Referring to the drawings wherein the same numerals are used whenever possible to designate the same or similar parts, FIG. 1 shows a prior art collector well 9 for use in removing an overlying oil layer 10 having a static water interface 12 with a water table 14 in an aquifer 16. The oil layer 10 may have been in the ground for a long period of time and may constitute an accumulation of several oil spills under an oil refinery, oil storage zone, etc. The thickness of the oil layer may be on the order of several inches to several feet. If aquifer 16 is used to supply water wells for human or industrial consumption, the oil layer 10 becomes a source of pollution and must be removed. This can be accomplished in the prior art by drilling the well 9 into the aquifer 16 and setting suitable casing 20, at or near the locus of the oil spill, to a sufficient depth so that the well's casing 20 extends deep into the aquifer to a predetermined position below a desired cone of depression 15. Casing 20 is open ended and slotted to permit oil and water to enter the well.

Figure 4:
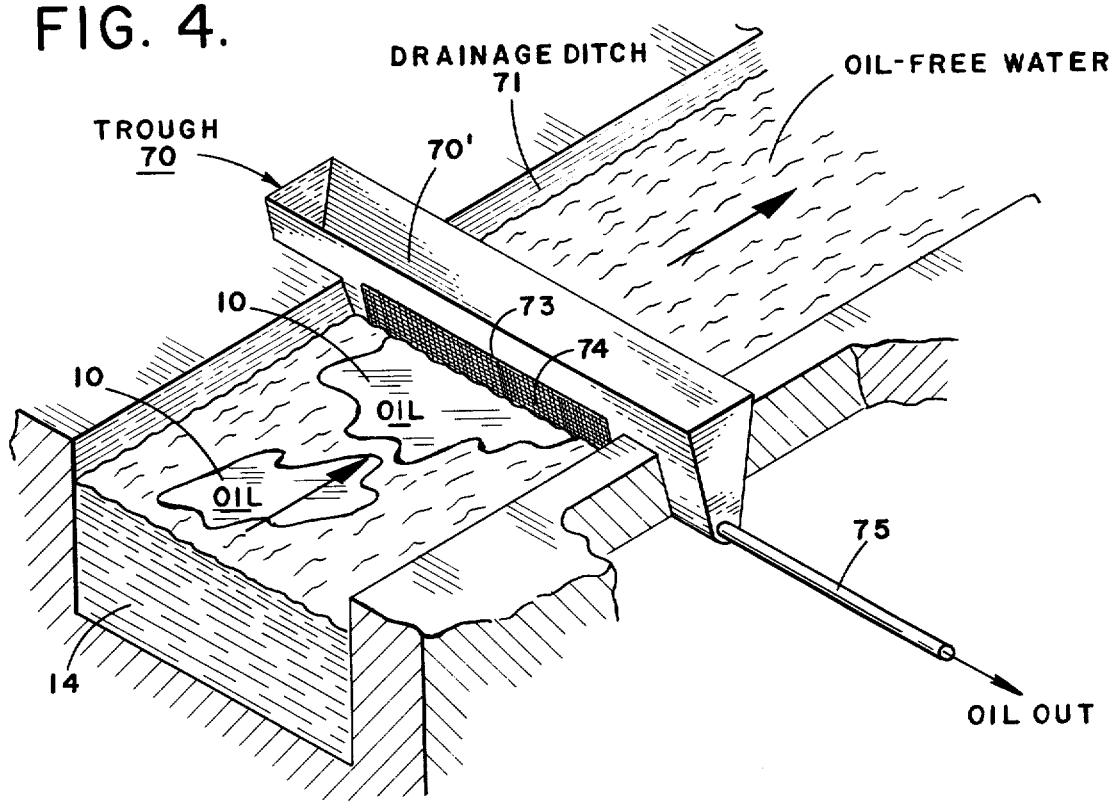
FIGS. 4 and 5 illustrate the application of the skimmer method to an open ditch in which oil and water are flowing together.
Figure 5:
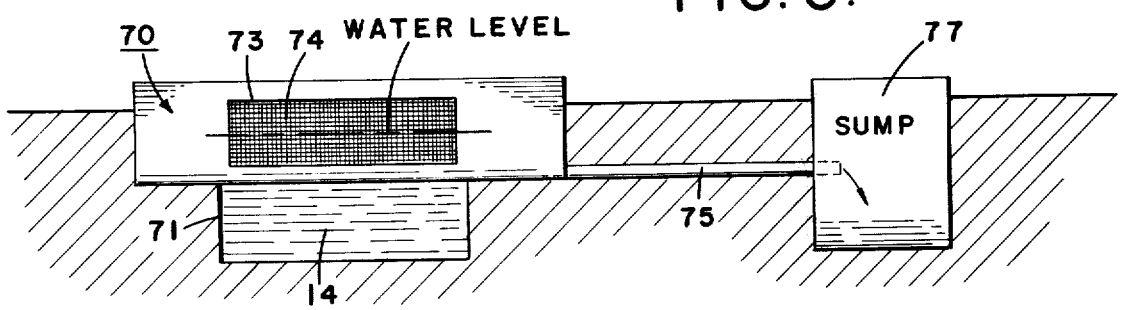

A submersible water pump 22 is lowered to the bottom of the well. When the pump starts moving water to the earth's surface through a pipe 23, there develops a cone of depression 15 in the water table 14. Oil commences to flow into the cone from a circular area around the well. The radius of this circle depends upon the depth of the cone and the permeability of aquifer 16. Since both oil and water enter casing 20, there becomes established in the well an overlying oil column 24 and an underlying water column 25 separated by an interface 26. If all the oil is removed and water pumping is discontinued, interface 26 has a potential of returning to its original static level 12.

To remove the oil from oil column 24, an oil pump 27 is lowered into the oil and held in place above interface 26. Through pipe 28 which is attached to oil pump 27, oil is pumped to the surface. Collector well 9 operates as long as necessary to completely deplete oil layer 10. As the radius of influence of a collector well may reach out as far as 400 feet, collector wells may be drilled in non-overlapping patterns of up to 800 feet apart for maximum efficiency.

The present invention has wide applications but will be first described for use as a skimmer well 29 which can substitute for the known collector well 9. To assist in bringing out their similarities, the same numerals will be used whenever possible.

The skimmer well 29 of this invention uses a casing 30 similar to casing 20 except that casing 30 need be perforated with perforations 35 only over a distance which extends slightly above and below the static oil-water interface 12. A skimmer pipe 32 is suspended inside casing 30. Pipe 32 has a closed lower end 33 and an open upper end 34 which is adjustably mounted on casing 30 by a support means 31. Pipe 32 is provided between its ends with one or more openings or ports 36 with the lower end 37 of each such port lying at or slightly above the potential water level 38. This is the level to which depressed interface 12 will rise when the oil layer 10 is completely removed. Below ports 36, pipe 32 defines a reservoir 32' of sufficient volume to contain therein an appreciable amount of the skimmed off oil. One simple method for determining the potential water level consists of lowering a manometer tube 39 with an end plug 39' outside the casing 30 so that end plug 39' of the manometer penetrates below the static oil-water interface 12. The plug is then pushed out and the highest level of the water column in tube 39, relative to a reference level such as sea level, provides a very accurate measure of the potential water level 38.

Inside pipe 32 is introduced a small-diameter pipe 40 which extends down to or near the closed end 33. Pipe 40 is connected to a surface squeeze pump 41 which pumps the produced oil into an oil tank 42.

Oil and water enter the well 29 through the ports 35 in casing 30 and again there will be established inside casing 30 a water column 25 and an overlying oil column 24. The oil entering through ports 35 also accumulates in the reservoir 32' provided by the closed-end pipe 32 to form therein a column of oil 44. The oil which has thus been skimmed off the water table 14 is pumped into the storage reservoir 42 by the surface pump 41.

It should be noted from the drawings that the top surface of the oil layer 10 develops a slight cone of depression around the ports 36. As the oil layer 10 becomes depleted, the water column 25 inside casing 30 rises to lift the oil column 24 therein, thereby assuring that all the oil will eventually be skimmed off into pipe 32.

The skimmer well shown in FIG. 2 can be modified for special cases of water level fluctuation by fixing a suitable hydrophobic filter 49 over ports 36. Thus only oil will enter into reservoir 32' and assure good skimming effects. A suitable filter material made of Teflon (Dupont Reg. TM) is commercially available under the trade name of "ZITEX" and can be purchased from Chemplast, Inc. in Wayne, New Jersey.

The advantages of the skimmer well 29 over a collector well 9 are then easily apparent, the most outstanding advantages of which include: no need for producing and disposing of large quantities of polluted water with its attendant possible problems of subsidence, no need for a separate and frequently expensive submersible water pump and all the problems associated therewith, and no need to attend to the operation of the skimmer well 29 by trained and expensive personnel.

When the oil layer 10 extends over a considerable area, several such skimmer wells can be drilled and simultaneously operated. The oil can be produced at a rate commensurate with the rate of oil inflow into skimmer pipe 32.

In FIG. 3 is shown an application of the method of this invention to an open pit oil skimmer in which gravel 50 is substituted for casing 30. The gravel surrounds a steel drum 52 having a closed end 53 and defining a reservoir 52'. A ring of holes 54, each having a diameter of about a one-fourth inch, lies in a plane contiguous with the free water level 12. The surrounding oil will skim off into reservoir 52' from which it can be removed in a manner similar to that previously described in connection with well 29. As the oil is depleted from the oil layer 10, the depressed oil-water interface 26 will rise slowly and push up the oil layer so that all the oil will ultimately enter into reservoir 52'. For good oil inflow, the oil should be maintained at a low level in reservoir 52'.

A significant advantage of the present invention is derived from the fact that bacterial slimes do not flow into a skimmer well because they lie at the base of the oil column, directly on the water table, and the oil flows over these slimes. Accordingly, oil produced by the method of this invention is relatively clean.

Sizes of the various casings, pipes and tubes employed are to be determined by the conditions prevailing in the field: the larger the cross-sectional area of the skimmer pipe, the larger will the volume of the reservoir be and hence the stored volume of skimmed oil. If oil is pumped from the skimmer faster than it flows in, there is a possibility for the oil pump to run dry. Oil flows into the reservoir at its own natural rate and this method itself cannot accelerate the rate of inflow from the formation. The number of skimmer ports is not critical. There may be only one such port, but preferably several such ports should be provided.

In FIG. 4 is shown an oil trap container 70 defining a reservoir 70' and serving as a dam or trough for use in an open ditch 71 in which a stream of flowing water 14 carries free oil 10 overlying the water stream. Trough 70 extends down into the moving water and is provided with an opening 73 which is preferably covered with a hydrophobic filter 74. A drain pipe 75 will carry away the skimmed off oil from reservoir 70' to a sump 77, while water is forced to pass under trough 70 that is interposed in its path and continue past the trough as oil-free water.

Figure 6:
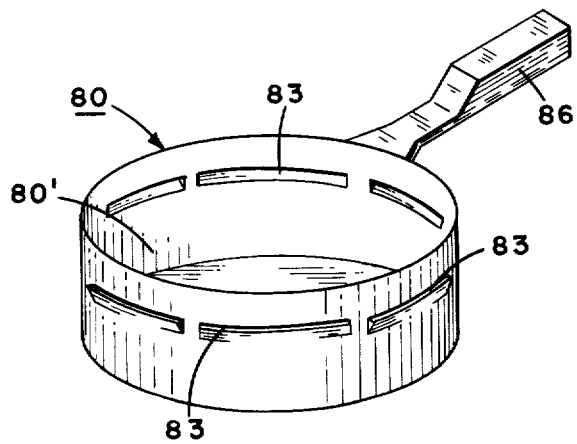
FIGS. 6 and 7 show a hand skimmer for use, for example, in homes and restaurants.
Figure 7:
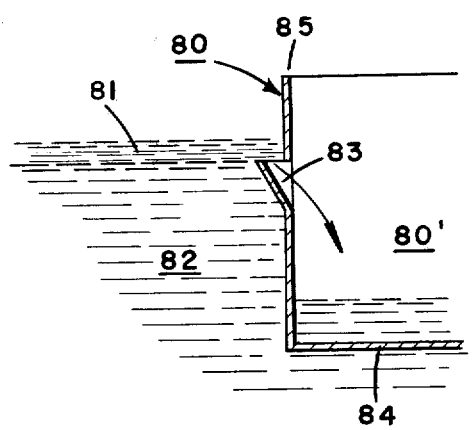

FIGS. 6 and 7 show the application of the invention to an oil skimmer 80 for use, for example, in homes and restaurants to remove a grease layer 81 overlying a sauce layer 82. Skimmer 80 defines a reservoir 80' of sufficient volume capacity and is provided with at least one louver port 83 between its closed end 84 and its top end 85. The skimmer is inserted into the sauce 82 and is held by its handle 86. Only grease will enter into reservoir 80' through ports 83 and after a sufficient volume of grease is accumulated therein, the contents of the skimmer will be emptied.

While the invention has been described with great emphasis upon a two-liquid system comprising oil and water, it is equally applicable to liquids other than oil and water. Various other applications will readily suggest themselves to those skilled in the art and all such uses and modifications of the invention are contemplated herein, all as encompassed by the scope of the claims appended hereto.

What is claimed is:

1. A skimmer apparatus for removing an overlying liquid from underlying liquid in an underground well containing a two-liquid body comprising:
    a skimmer pipe adapted to be lowered into said well, said pipe having a closed lower end and an upper end and said pipe being provided between its ends with at least one port, said port extending above the potential level for the underlying liquid;
    an outer slotted casing substantially concentrically positioned in said well with respect to said skimmer pipe,
    said pipe defining below said port a reservoir of sufficient volume to contain therein an appreciable amount of the skimmed off overlying liquid; and
    means for removing the liquid collected in said reservoir.

* * * * *